United States Patent [19]

Nakayama

[11] Patent Number: 5,162,662

[45] Date of Patent: Nov. 10, 1992

[54] COMPACT POWER SUPPLY WITH GAS ENGINE

[75] Inventor: Hironori Nakayama, Iwata, Japan

[73] Assignee: Yamaha Hatsudoki Kabushiki Kaisha, Shizuoka, Japan

[21] Appl. No.: 586,559

[22] Filed: Sep. 21, 1990

[30] Foreign Application Priority Data

Sep. 22, 1989 [JP] Japan .................................. 1-247753

[51] Int. Cl.$^5$ ............................................. F02B 63/04
[52] U.S. Cl. ..................................... 290/1 A; 290/1 R
[58] Field of Search ................................. 290/1 R, 1 A

[56] References Cited

U.S. PATENT DOCUMENTS

| 1,396,418 | 11/1921 | Gilliard | 290/1 R |
| 3,259,752 | 7/1966 | Honda | 290/1 R |
| 4,729,353 | 3/1988 | Streng | 290/1 A |

Primary Examiner—A. D. Pellinen
Assistant Examiner—Robert Lloyd Hoover
Attorney, Agent, or Firm—Ernest A. Beutler

[57] ABSTRACT

A compact portable power supply including an internal combustion engine that drives a generator and which engine is fueled by a pressurized source of gaseous fuel. The outer housing and control structure is configured in such a way that the source of gaseous fuel will always be oriented so that liquid fuel will not be delivered to the engine when the power supply is in use.

15 Claims, 4 Drawing Sheets

COMPACT POWER SUPPLY WITH GAS ENGINE

BACKGROUND OF THE INVENTION

This invention relates to a compact power supply with a gas engine and more particularly to an improved fuel supply system for such a power supply.

Recently, it has been proposed to provide a small compact power supply that can offer a ready source of electrical energy that may be utilized for a wide variety of purposes. For example, such power supplies can be employed for providing electrical power for a campsite, electrical power on small watercraft not having their own power systems and a wide variety of other purposes.

A power supply of this type may include a small electrical generator that is driven by a small internal combustion engine, such as a single cylinder, two-cycle, crankcase compression engine. For safety and other purposes, it is desirable if the engine can be powered by a gaseous fuel of the type that is stored under pressure in a container. Such fuel sources are readily available. This type of pressurized gaseous fuel source is frequently used in many home applications for a source of cooking heat. In addition, these same fuel sources are also employed in camping stoves and, hence, it is advantageous if portable power supplies can be fueled by such fuel.

In conjunction with the use of such pressurized gaseous fuel systems, the pressure at which the gaseous fuel is stored is high enough so that the gas is actually converted to a liquid which is stored in the container. Of course, an amount of pressurized gas will be present in the container over the head of the liquid even when the container is filled to its maximum capacity.

This type of fuel source normally has an outlet fitting at its top that has a check valve which cooperates with a receptacle so that when the fuel source is connected to the receptacle, gaseous fuel may flow to the receptacle and then to its point of consumption. These outlet fittings are normally formed with an angularly shaped pipe that extends into the container and which is disposed so that when the fuel source is located in a horizontal condition that the inlet opening of the outlet fitting will be above the liquid level in the container. This is done so as to insure that liquid is not discharged along with the pressurized gaseous fuel when the system is in operation. Obviously, it is not desirable to discharge the fuel in its liquid form.

In connection with stove use, the receptacle of the stove and the outlet fitting of the gaseous fuel container are configured in such a way that they can only be assembled in such a way that the inlet opening of the outlet fitting is disposed at the vertically highest point of the container when it is in a horizontal operation. This will insure that the liquid will not be discharged along with the gaseous fuel in operation.

With power supplies of the type aforedescribed, however, it is desirable to insure that the power supply can operate in more than one orientation. That is, the power supply is designed something like a small briefcase or suitcase and has a carrying handle so that it can be carried from place to place. Frequently, the power supply will operate in this same upright position. However, previously proposed power supplies of this type have also been capable of being operated in a wide variety of other orientations. With liquid fuel sources of the type aforedescribed, this raises the possibility that the gaseous fuel source could be positioned in such an orientation that liquid fuel would be discharged along with the gaseous fuel. This could result in uneven running of the engine and, in fact, stalling of the engine. Furthermore, at the minimum, such improper orientation could result in high fuel consumption.

It is, therefore, a principal object of this invention to provide an improved portable power supply that is powered by an internal combustion engine running on pressurized gaseous fuel wherein the power supply and fuel source are constructed and oriented in such a way that liquid fuel cannot be discharged during normal running operations.

It is a further object of this invention to provide a gaseous fuel source and related structure for a portable power supply so that the power supply will not be oriented in operation in such a manner that liquid fuel will be discharged to the engine.

SUMMARY OF THE INVENTION

This invention is adapted to be embodied in a portable power supply having an outer housing. An internal combustion engine is supported within the outer housing and drives a generator for providing a source of electrical power from the power supply. A container providing a source of pressurized gaseous fuel for the engine is positioned within the outer housing. The fuel in the container is at least in part in liquid form when the container is substantially filled. The container has an outlet fitting having an inlet opening contained within the container and configured and oriented to be above the liquid level when the container is substantially filled in at least certain positions of the container. Control means are accessible externally of the outer housing for operating the power supply. The control means is accessible only in stable positions of the power supply in which the container is in at least some of its certain positions.

DETAILED DESCRIPTION OF THE PREFERRED EMBODIMENTS

Figure 1:
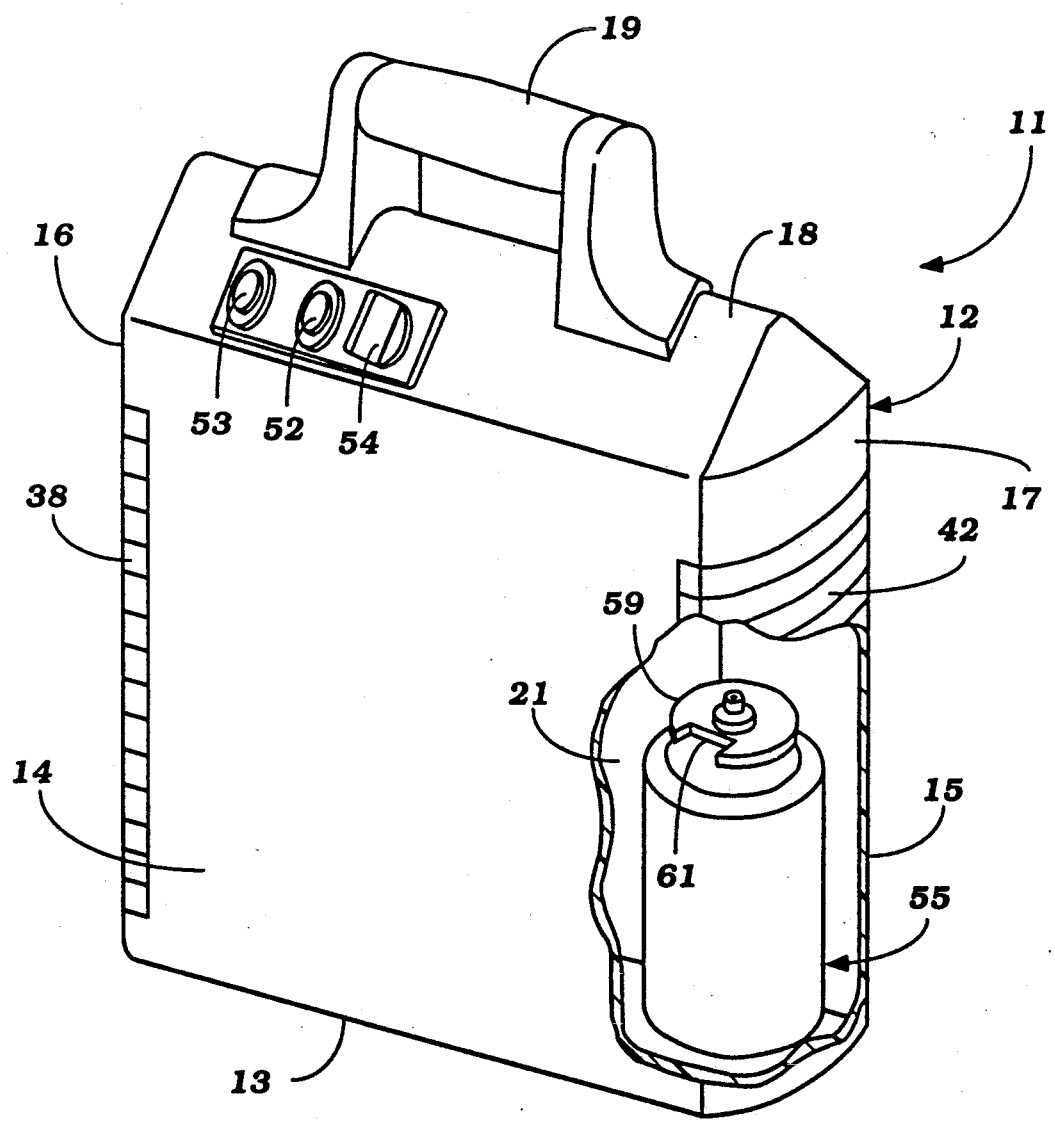
FIG. 1 is a perspective view of a portable power supply constructed in accordance with an embodiment of the invention, with a portion broken away to more clearly show the container for the pressurized gaseous fuel and its orientation.
Figure 2:
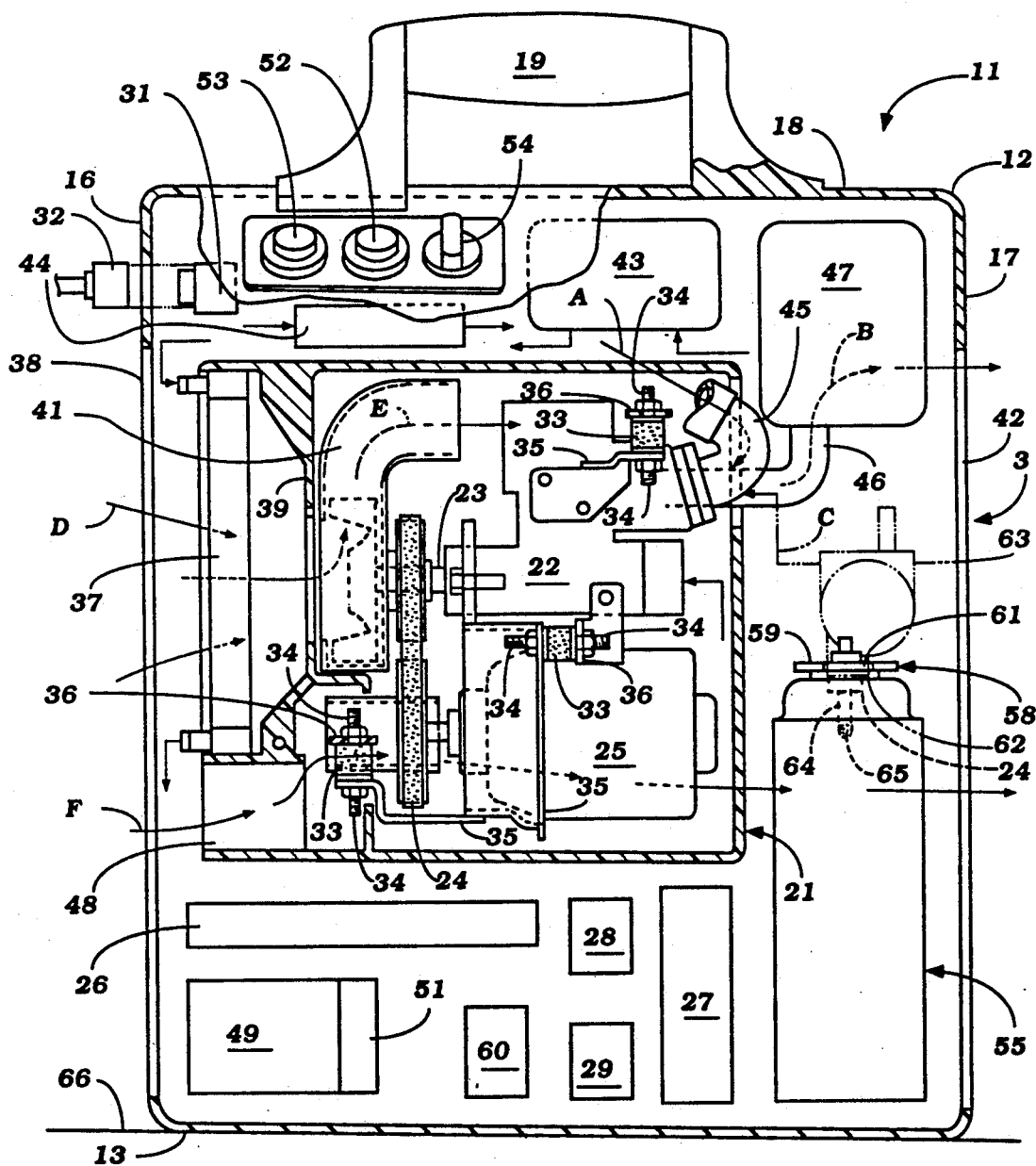
FIG. 2 is an enlarged side elevational view of the power supply, with a portion of the outer housing broken away to show the interior construction and with certain of the components shown in schematic form.

Referring now in detail to the figures of the drawings, a portable power supply constructed in accordance with an embodiment of the invention is identified generally by the reference numeral 11. The power supply 11 is designed so as to provide a small, compact source of electrical power for a wide variety of applications, such as on small watercraft, at campsites or the like.

The power supply 11 is comprised of an outer case, indicated generally by the reference numeral 12, and which may be formed from any suitable material such as a molded plastic. The outer case 12 has a configuration that is comprised of a generally flat bottom 13, a pair of generally planar sides 14 and 15 and a pair of ends 16 and 17. Upper ends of the sides 14 and 15 curve inwardly to form a dome shaped top portion 18 that is blended into the end walls 16 and 17 through accurately curved portions. A handle 19 is formed integrally with or affixed to the dome shaped top portion 18.

An inner case, indicated generally by the reference numeral 21 is positioned within a generally open cavity formed by the outer case 12 centrally therein. The inner case 21 includes the power unit assembly, which includes an internal combustion engine 22. In the illustrated embodiment, the engine 22 is of the two-cycle, crankcase compression, single cylinder type and is water cooled. Although the invention has particularly utility in conjunction with such engines, other types of engines may be employed in conjunction with certain features of the invention.

The engine 22 drives a crankshaft 23 which is journaled for rotation about a generally horizontally extending axis and which is connected by means of a belt drive 24 to a combined starter/generator assembly 25. The starter/generator assembly 25 is constructed so that it will operate as an electrical starter for starting the engine 22 from a battery 26 that is mounted within the outer case 12 exterior of the inner case 21. Once the engine 22 has been started, then the electrical control, which is comprised of a main control unit 27, a starter relay 28, and a supply switching relay 29, will switch over so that the starter 25 then functions as a generator so as to charge the battery 26 and also supply electrical power to a receptacle 31 which is accessible through an opening in the end wall 16 so as to accommodate a plug 32 for supplying electrical power to any suitable device to be powered.

The power unit comprised of the motor 22 and starter/generator 25 is mounted within the inner case 21 by a plurality of mounting assemblies comprised of elastomeric isolators 33 which carry threaded fasteners 34 for affixation to mounting brackets 35 of the power supply and supporting lugs 36 formed on the inner case 21.

As has been noted, the power unit and particularly the internal combustion engine 22 is water cooled and there is provided a heat exchanging radiator 37 that is mounted in an opening formed at one side of the inner case 21 and which receives air drawn through an air inlet opening 38 of a grill like configuration that is formed in the end wall 16. A cooling fan, indicated by the reference numeral 39, is affixed to the engine crankshaft 23 and draws this cooling air through a duct 41. The duct 41 discharges the cooling air then across both the induction system and exhaust system for the engine 22, which will be hereinafter described, in the flow pattern indicated by the arrow E. The air then exits the outer housing 12 through an exhaust opening 42 formed in the end wall 17. The exhaust opening 42 is also a grill like opening.

The liquid cooling system for the engine 22 further includes an expansion tank 43 that is in circuit with the radiator 37 and the engine cooling jacket in an appropriate manner.

The engine 22 is provided with an induction system that includes an air cleaner 44 that is disposed within the outer housing 12 but which is spaced from the inner housing 21 so as to be insulated from the heat of the engine 22. The air cleaner 44 draws fresh air that enters through the inlet opening 38 and delivers it to an induction system including an intake manifold 45. A fuel system, to be described, also supplies fuel to the intake manifold 45 for running of the engine.

The exhaust gases from the engine 22 are discharged through an exhaust pipe 46 to a muffler 47 for silencing and discharging to the atmosphere along a path indicated by the arrow B and through the outlet opening 42 of the outer housing.

An inlet opening 48 is formed in the inlet side of the inner housing 21 adjacent the starter/generator 25 so that cooling air can flow through the path indicated by the arrow F across the starter/generator 25 to cool it.

The engine 22 is also provided with a separate lubricating system that includes a lubricant supply 49 that is contained within the lower part of the outer housing 12 and which delivers lubricant to a lubricant pump 51 which, in turn, delivers metered amounts of lubricant to the engine 22. The actual form of the lubricating system employed may be of any known type.

There are provided certain external controls for the power supply 11. For a reason which will be described, these external controls are mounted on one side of the dome shaped top portion 18 of the outer casing 12. These controls include a main control switch 52 that turns the system on and off, a starter switch 53 for initiating starting of the engine through operation of the starter/generator 25 as a starting motor, and a gas shut-off switch 54 that controls the supply of gaseous fuel, from the source now to be described, to the intake manifold 45. This gas control switch 54 controls a gas control regulator valve 60 mounted in the lower portion of the housing 12.

Figure 3:
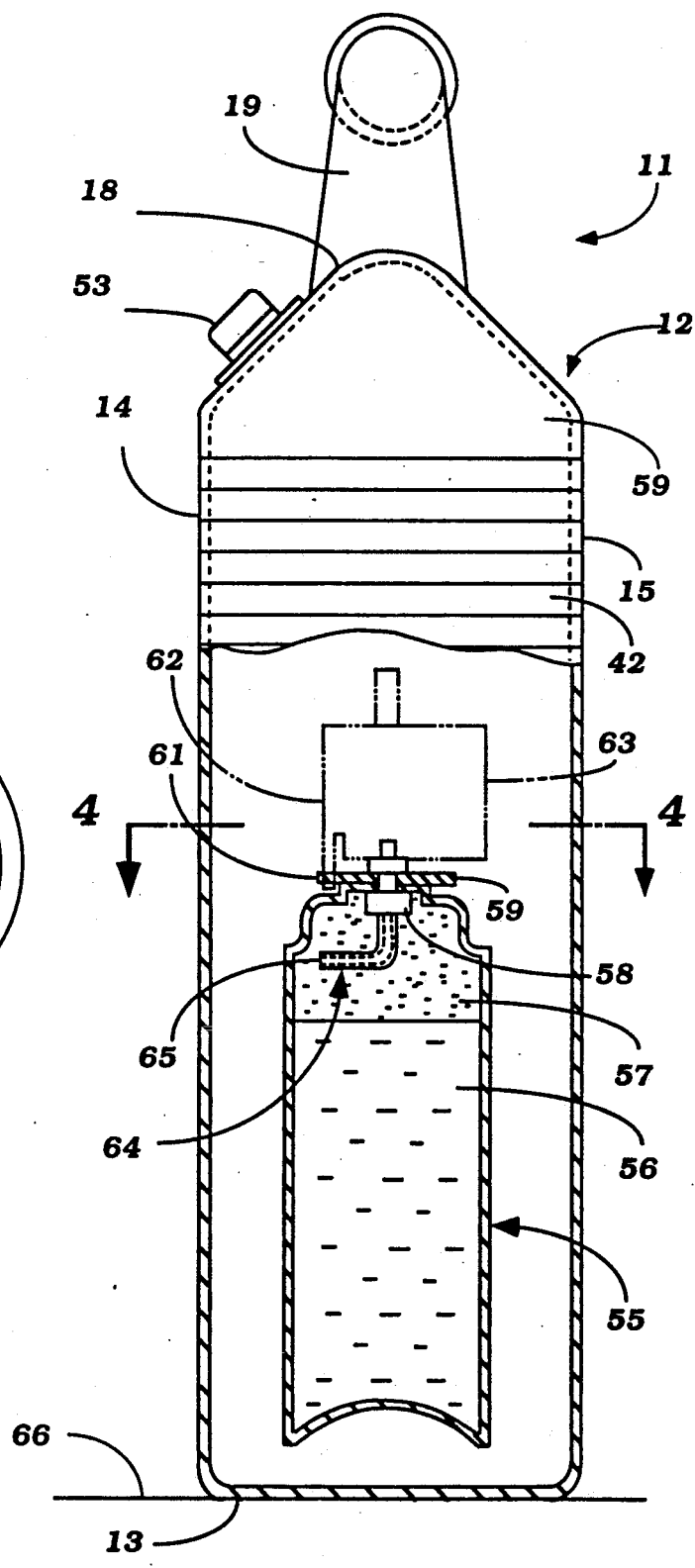
FIG. 3 is an end elevational view looking in the direction of the arrow 3 in FIG. 2, with a portion of the outer housing broken away and with the container for the pressurized gaseous fuel shown in cross section.
Figure 4:
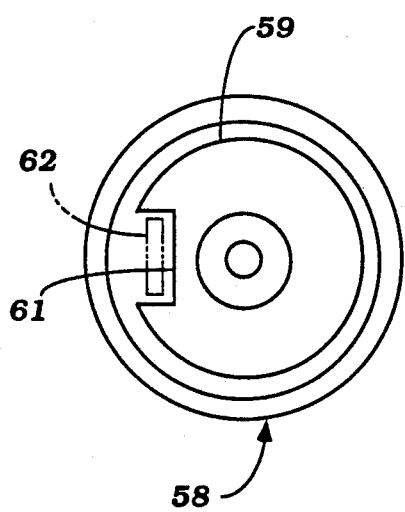
FIG. 4 is a cross-sectional view taken along the line 4—4 of FIG. 3 and shows how the container and receptacle interact.

The fuel supply for the engine 22 is comprised of a container 55 which is mounted in an upright manner adjacent the outlet opening 42 in the end wall 15 of the outer casing 12. The container 55 contains a pressurized gaseous fuel which is under sufficient pressure so as to liquefy it as may be best seen in FIGS. 3, 5 and 6 wherein the liquid level is indicated at 56 with a pressurized portion of the gas 57 above this liquid level. The condition shown in the figures is the nearly full condition of the container 55. That is, the liquid level shown in the drawings and indicated at 56 is the maximum liquid level when a filled container is positioned within the power supply 11.

The gaseous fuel and specifically the container 55 is of a type normally employed as a fuel source for small portable stoves. Such a fuel source has an outlet fitting, indicated generally by the reference numeral 58 provided at its upper end which outlet fitting 58 has a circular flange 59 formed in it in which an alignment notch 61 is formed. The alignment notch 61 cooperates with a projection 62 of a receptacle 63 to form a bayonet like connection so as to insure that the container 55 will be located in a specific orientation, as will be described.

Figure 5:
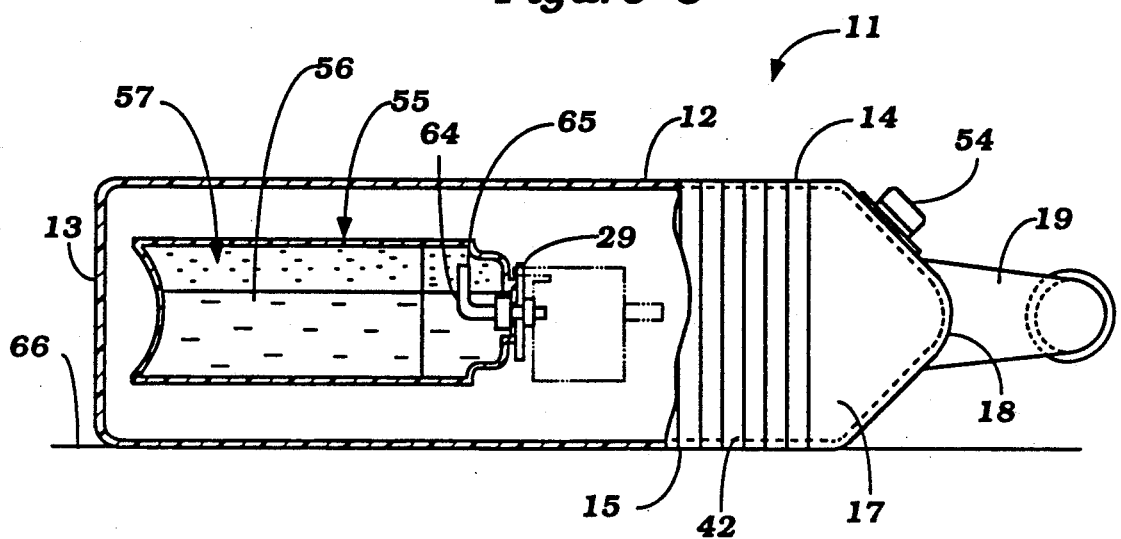
FIG. 5 is an end elevational view, in part similar to FIG. 3, on a smaller scale and showing another operative position for the power supply.

It will be noted that the outlet fitting 58 has a check valve from which an L-shaped tube 64 which depends into the container 58 and has an outlet opening 65 that is disposed at one side of the container 55 and facing the notch 61. In normal stove application, the outlet opening 65 will be positioned vertically upwardly so that when the container 55 is positioned on its side, as shown in FIG. 5, that liquid will never reach the outlet opening 65. This insures that only gaseous fuel will be discharged from the container 55 when in stove usage.

In accordance with the invention, the outer housing 12 and the location of the controls 52, 53 and 54 is such that the power supply will only be utilized in such a manner that gaseous fuel will be delivered to the engine and specifically its intake manifold 45. That is, liquid fuel will never be discharged during normal operation.

In order to achieve this result, the end walls 16 and 17 are accurately curved so that the power supply 11 cannot be placed upon either of its ends. Also, the handle 19 prevents the power supply from being utilized in an inverted condition. Hence, the power supply 11 can only be operated normally when standing on a horizontal surface, indicated at 66 in certain of the figures when standing on the base 13 or on one of its front or rear sides 14 or 15. However, since the controls 52, 53 and 54 are disposed so as to be accessible from the front face 14, a user will only operate the device either in the position shown in FIGS. 1 through 3 or FIG. 5. As a result, it will be insured that gaseous fuel and not liquid fuel will be supplied to the engine 22.

Figure 6:
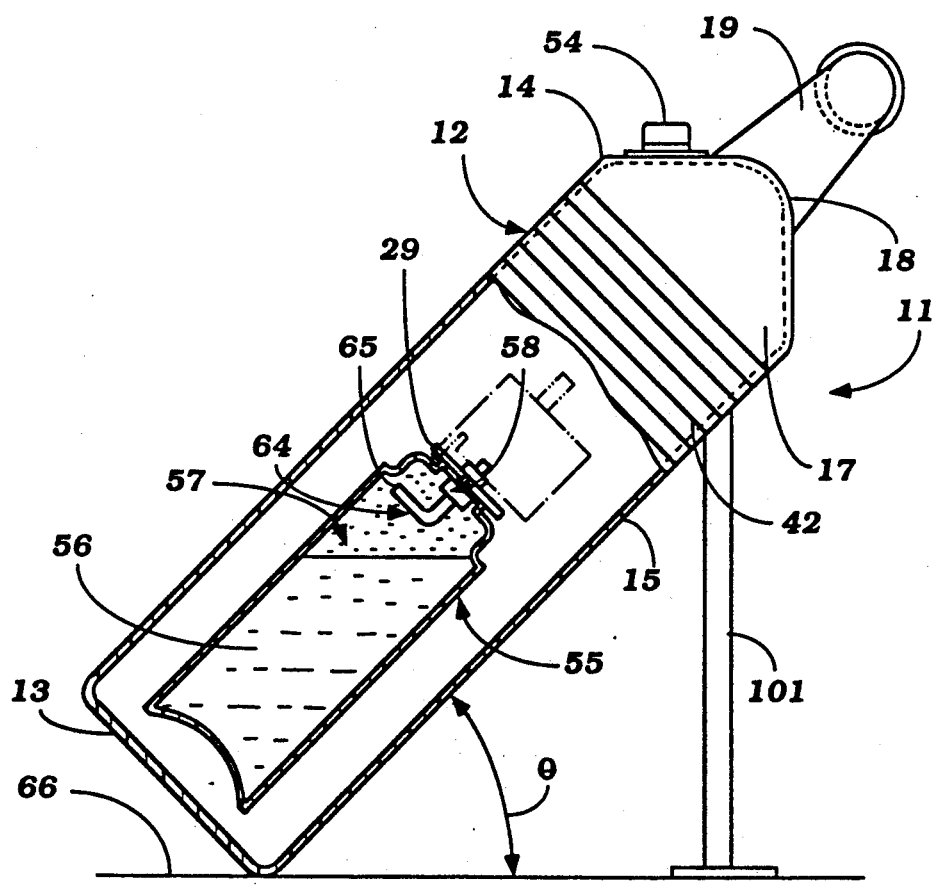
FIG. 6 is an end elevational view, in part similar to FIGS. 3 and 5, on the same scale as FIG. 5, and shows another alternative embodiment.

FIG. 6 shows another embodiment of the invention wherein a prop 101 may be formed either as a part of or separately from the outer housing 12 so that the power supply 11 may be disposed at an angle theta to the horizontal in addition to lying in a horizontal position.

It should be readily apparent from the foregoing description that the power supply is designed and constructed in such a way that only the gaseous portion of the pressurized fuel from the container 55 will be delivered to the engine 22. That is, it is substantially impossible for an operator to operate the power supply 11 in a mode when liquid fuel could be delivered to the engine. Although embodiments of the invention have been illustrated and described, various changes and modifications may be made without departing from the spirit and scope of the invention, as defined by the appended claims.

I claim:

1. In a portable power supply having an outer housing, an internal combustion engine within said outer housing, a generator driven by said engine and providing a source of electrical power from said power supply, a container of pressurized gaseous fuel for said engine detachably contained within said outer housing, the fuel in said container being at least in part in liquid form when said container is substantially filled, an outlet unit within said container and having an inlet opening contained within said container and configured and oriented to be above the liquid level in said container when said container is substantially filled in at least certain positions of said container, and control means accessible externally of said outer housing for operating said power supply, said control means being accessible only in stable positions of said power supply in which said container is in at least some of said certain positions.

2. In a portable power supply as set forth in claim 1 wherein the housing is configured to be stable in only certain positions which correspond to at least some of the certain positions of the container.

3. In a portable power supply as set forth in claim 1 wherein the housing is configured to be stable only when standing on its bottom and inclined toward at least one side.

4. In a portable power supply as set forth in claim 3 wherein the top and the ends of the outer housing are configured so as to preclude standing of the power supply thereupon in stable orientation.

5. In a portable power supply as set forth in claim 4 wherein the outer housing contains a gas receptacle for connection to the fuel container that orients the fuel container relative to the outer housing.

6. In a portable power supply as set forth in claim 5 wherein the container and receptacle have interlocking parts.

7. In a portable power supply as set forth in claim 6 wherein the interlocking parts comprises a notch on the outlet of the container and a cooperating bayonet on the receptacle.

8. In a portable power supply as set forth in claim 1 wherein the outer housing contains a gas receptacle for connection to the fuel container that orients the fuel container relative to the outer housing.

9. In a portable power supply as set forth in claim 8 wherein the container and receptacle have interlocking parts.

10. In a portable power supply as set forth in claim 1 wherein the control means comprises a starter switch for the engine.

11. In a portable power supply as set forth in claim 10 wherein the generator comprises a combined starter/generator for starting of the engine and generating electrical power.

12. In a portable power supply as set forth in claim wherein the control means further includes a gas control switch.

13. In a portable power supply as set forth in claim 12 wherein the gas control switch and the fuel source further includes a pressure regulator.

14. In a portable power supply as set forth in claim 1 wherein the control means further includes a gas control switch.

15. In a portable power supply as set forth in claim 14 wherein the gas control switch and the fuel source further includes a pressure regulator.

* * * * *

UNITED STATES PATENT AND TRADEMARK OFFICE
CERTIFICATE OF CORRECTION

PATENT NO. : 5,162,662
DATED : November 10, 1992
INVENTOR(S) : Hironori Nakayama It is certified that error appears in the above-identified patent and that said Letters Patent is hereby corrected as shown below:

Column 6, line 43, Claim 12, after "claim" insert --11--.

Signed and Sealed this

Ninth Day of November, 1993

Attest:

BRUCE LEHMAN

*Attesting Officer*   *Commissioner of Patents and Trademarks*